United States Patent
Su et al.

(10) Patent No.: US 10,931,974 B2
(45) Date of Patent: Feb. 23, 2021

(54) METHOD AND APPARATUS OF SMOOTHING FILTER FOR RINGING ARTEFACT REMOVAL

(71) Applicant: MEDIATEK INC., Hsin-Chu (TW)

(72) Inventors: Yu-Chi Su, Hsinchu (TW); Tzu-Der Chuang, Hsinchu (TW); Ching-Yeh Chen, Hsinchu (TW); Chih-Wei Hsu, Hsinchu (TW); Yu-Wen Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/341,189

(22) PCT Filed: Oct. 12, 2017

(86) PCT No.: PCT/CN2017/105845
§ 371 (c)(1),
(2) Date: Apr. 11, 2019

(87) PCT Pub. No.: WO2018/068744
PCT Pub. Date: Apr. 19, 2018

(65) Prior Publication Data
US 2019/0342582 A1    Nov. 7, 2019

Related U.S. Application Data

(60) Provisional application No. 62/410,416, filed on Oct. 20, 2016, provisional application No. 62/408,145, filed on Oct. 14, 2016.

(51) Int. Cl.
*H04N 19/86* (2014.01)
*H04N 19/117* (2014.01)
(Continued)

(52) U.S. Cl.
CPC ........... *H04N 19/86* (2014.11); *H04N 19/117* (2014.11); *H04N 19/159* (2014.11); *H04N 19/176* (2014.11); *H04N 19/82* (2014.11)

(58) Field of Classification Search
CPC .... H04N 19/86; H04N 19/176; H04N 19/117; H04N 19/159; H04N 19/82
See application file for complete search history.

(56) References Cited

U.S. PATENT DOCUMENTS

| 6,539,056 B1 | 3/2003 | Sato et al. |
| 6,965,395 B1 | 11/2005 | Neter |

(Continued)

FOREIGN PATENT DOCUMENTS

| CN | 101567964 A | 10/2009 |
| CN | 103220529 A | 7/2013 |

(Continued)

OTHER PUBLICATIONS

International Search Report dated Jan. 4, 2018, issued in application No. PCT/CN2017/105845.

(Continued)

*Primary Examiner* — Joseph W Becker
(74) *Attorney, Agent, or Firm* — McClure, Qualey & Rodack, LLP

(57) ABSTRACT

Methods and apparatus for video coding using ringing smoothing filter (RSF) are disclosed. According to one method, ringing smoothing filter (RSF) is applied to the reconstructed residuals to form smoothed reconstructed residuals or applied to an in-loop-filtered reconstructed block to form a smoothed-filtered reconstructed block for the current block, where the RSF corresponds to an edge-preserving filter. The ringing smoothing filter (RSF) may correspond to a bilateral filter. According to another method, adaptive RSF is derived based on information comprising (Continued)

Intra prediction mode or Inter prediction mode. In yet another method, whether to apply ringing smoothing filter (RSF) to a current block in the current image is determined based on one or more control flags. If the control flag(s) indicates the RSF being on for the current block, the RSF is applied to the current block.

2 Claims, 9 Drawing Sheets

(51) Int. Cl.
*H04N 19/159* (2014.01)
*H04N 19/176* (2014.01)
*H04N 19/82* (2014.01)

(56) References Cited

U.S. PATENT DOCUMENTS

| | | | |
|---|---|---|---|
| 9,118,932 | B2 | 8/2015 | Avadhanam et al. |
| 2005/0025236 | A1 | 2/2005 | Yan et al. |
| 2008/0159386 | A1 | 7/2008 | Lee et al. |
| 2012/0263225 | A1 | 10/2012 | Lee |
| 2013/0016780 | A1* | 1/2013 | Oh .................. H04N 19/80 375/240.12 |
| 2013/0286288 | A1 | 10/2013 | Zhang et al. |
| 2014/0321529 | A1* | 10/2014 | Jung .................. H04N 19/70 375/240.02 |
| 2014/0369613 | A1* | 12/2014 | Avadhanam ......... H04N 19/176 382/233 |
| 2015/0189329 | A1 | 7/2015 | Wada |
| 2016/0212433 | A1 | 7/2016 | Zhu et al. |
| 2016/0261882 | A1* | 9/2016 | Chien .................. H04N 19/523 |
| 2019/0200011 | A1* | 6/2019 | Yoo .................. H04N 19/11 |
| 2019/0310755 | A1* | 10/2019 | Sasaki .................. G06F 3/041 |

FOREIGN PATENT DOCUMENTS

| | | |
|---|---|---|
| CN | 103763564 A | 4/2014 |
| CN | 104244015 A | 12/2014 |
| CN | 104732492 A | 6/2015 |
| CN | 104994397 A | 10/2015 |
| CN | 105141948 A | 12/2015 |

OTHER PUBLICATIONS

Lee, Y.L., et al.; "Loop Filtering for Reducing Blocking Effects and Ringing Effects;" ITU—Telecommunications Standardization Sector; Jul. 1998; pp. 1-8.

Valin, J.M.; "Directional Deringing Filter;" Network Working Group; Mar. 2016; pp. 1-8.

Zou, F., et al.; "Edge-based adaptive directional intra prediction;" 28th Picture Coding Symposium, PCS2010; Dec. 2010; pp. 366-369.

Chinese language office action dated Nov. 25, 2020, issued in application No. CN 201780061510.1.

Paris, S., et al.; "Bilateral Filtering: Theory and Applications," Foundations and Trends in Computer Graphics and Vision; vol. 4; No. 1; Jan. 2009; pp. 1-75.

* cited by examiner

METHOD AND APPARATUS OF SMOOTHING FILTER FOR RINGING ARTEFACT REMOVAL

CROSS REFERENCE TO RELATED APPLICATIONS

The present invention claims priority to U.S. Provisional Patent Application, Ser. No. 62/408,145, filed on Oct. 14, 2016 and U.S. Provisional Patent Application, Ser. No. 62/410,416, filed on Oct. 20, 2016. The U.S. Provisional patent applications are hereby incorporated by reference in their entireties.

FIELD OF INVENTION

The present invention relates to smoothing filter to remove ringing artefacts in video coding. In particular, the present invention discloses adaptive ringing smoothing filter (RSF) based on characteristics of reconstructed video data or related coding parameters to improve the coding performance. Furthermore, the RSF can be applied to residuals, reconstructed data or filtered-reconstructed data.

BACKGROUND OF THE INVENTION

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. After obtaining the residual block by the prediction process based on PU splitting type, the prediction residues of a CU can be partitioned into transform units (TU) according to another quadtree structure which is analogous to the coding tree for the CU. A 2D transform is then applied to the TU for further coding process.

FIG. 1A illustrates an exemplary adaptive Inter/Intra video coding system incorporating in-loop filter processing based on HEVC. For Inter/Intra prediction (110) is used to generate prediction data based on the input frame and previous coded data stored in frame buffer 180. The differences between the input data and prediction data are generated using an adder 115 by subtracting the prediction from the input. The differences are also referred as prediction errors, residuals or residues, which are then processed by Transform (T) and Quantization (Q) 120. The transformed and quantized residues are then coded by Entropy Encoder 130 to generate a video bitstream corresponding to the compressed video data. The bitstream associated with the transform coefficients is then packed with side information such as motion, coding modes, and other side information associated with the image area (not shown explicitly in FIG. 1A).

When an Inter/Intra prediction is used, reconstructed data have to be generated at the encoder side as well. Consequently, the transformed and quantized residues are processed by Inverse Quantization (IQ) and Inverse Transformation (IT) 140 to recover the residues. The residues are then added back to prediction data using Reconstruction unit (REC) 150 to form reconstructed video data. Since the incoming video data undergo a series of processing in the encoding system, the reconstructed video data from REC 150 may be subject to various impairments due to a series of coding process. Accordingly, in-loop filters including deblocking filter (DF) 160 and Sample Adaptive Offset (SAO) 170 have been used in the High Efficiency Video Coding (HEVC) standard to improve visual quality or to reduce bitrate. The reconstructed video data are then stored in Frame Buffer 180 to derive Intra/Inter predictors for subsequent coding process.

FIG. 1B illustrates a system block diagram of a corresponding video decoder for the encoder system in FIG. 1A. Since the encoder also contains a local decoder for reconstructing the video data, some decoder components are already used in the encoder except for The Entropy Decoder 132. Furthermore, while both motion estimation and compensation are needed for Intra/Inter prediction 110 at the encoder side, only motion compensation is required for Intra/Inter prediction 112 at the decoder side. The in-loop filtered output from SAO 170 can be used as decoded video output.

Recently, a bilateral filter has been disclosed by Paris, et al. ("Bilateral Filtering: Theory and Applications, Foundations and Trends in Computer Graphics and Vision, Vol. 4, No. 1 (2008), pp 1-73) to reduce noise and artefacts while preserving edges and important details in an image.

In order to further improve the video coding performance, various improved filtering techniques have been disclosed in this application.

SUMMARY OF THE INVENTION

A method and apparatus for video coding using ringing smoothing filter (RSF) are disclosed. According to the present invention, input data associated with a current image are received. De-quantized and inverse transformed data corresponding to reconstructed residuals associated with a current block in the current image are derived from the input data. Ringing smoothing filter (RSF) is applied to the reconstructed residuals to form smoothed reconstructed residuals or applied to an in-loop-filtered reconstructed block to form a smoothed-filtered reconstructed block for the current block, where the RSF corresponds to an edge-preserving filter. A final reconstructed block for the current block is generated by utilizing the smoothed reconstructed residuals or the smoothed-filtered reconstructed block. The final reconstructed block can be stored in a buffer as reference data for prediction of subsequent images in an encoder side or providing the final reconstructed block as output for a current reconstructed image in a decoder side. The ringing smoothing filter (RSF) may correspond to a bilateral filter.

In one embodiment, parameters associated with the RSF are estimated at both the encoder side and the decoder side in a same manner so as to eliminate a need for transmitting the parameters from the encoder side to the decoder side. For example, the parameters can be estimated based on coding information, characteristics of reconstructed residuals associated with the current image, characteristics of a current reconstructed image, or a combination thereof.

At the decoder side, the input data may correspond to a bitstream including compressed data of the current image. At the decoder side, the transformed-quantized residuals are derived from the input data by applying entropy decoding to the bitstream. Inverse transform and de-quantization are then applied to the transformed-quantized residuals to form the reconstructed residuals. At the encoder side, the input data may correspond to pixel data of the current image. Inter or Intra prediction is then applied to a current block in the current image to generate residuals associated with the current block. Transform and quantization are applied to the residuals to derive transformed-quantized residuals. Inverse transform and de-quantization are then applied to the transformed-quantized residuals to form the reconstructed residuals.

According to another method, a ringing smoothing filter (RSF) is derived based on information comprising Intra prediction mode or Inter prediction mode, where the RSF corresponds to an edge-preserving filter. The RSF is then applied to the reconstructed residuals to form smoothed reconstructed residuals, to a current reconstructed block to form a current smoothed reconstructed block, or to a current in-loop-filtered reconstructed block to form a current smoothed-filtered reconstructed block. A final current reconstructed block is generated by utilizing the smoothed reconstructed residuals, the current smoothed reconstructed block or the current smoothed-filtered reconstructed block. In one embodiment, the RSF is configured as a one-dimensional filter if the current block is coded in vertical or horizontal Intra prediction mode. In another embodiment, coefficients and footprint of the RSF are estimated according to the prediction mode of the current block. In yet another embodiment, the coefficients of the RSF and shape of the footprint of the RSF are adjusted to fit an angular direction of a current Intra prediction if the current block is Intra-prediction coded. In yet another embodiment, different RSFs are used for a luma block and a chroma block of the current block. In yet another embodiment, the filter size of the RSF is configured according to coding information, where the coding information comprises QP (quantization parameter), position in a TU (transform unit), size of CTU (coding tree unit), CU (tree unit), PU (prediction unit) or TU, prediction mode, or a combination thereof. In yet another embodiment, the RSF is only applied to one out of every N to-be-filtered samples in a horizontal or vertical direction, where N is a positive integer. In yet another embodiment, the RSF utilizes subsampled neighbouring samples of a current centre sample to derive a smoothed current sample for the current block. In yet another embodiment, said applying the RSF comprises combining RSF filtered samples with un-filtered samples. Furthermore, equations to derive generalized weighting parameters are also disclosed.

In yet another method, one or more control flags regarding whether to apply ringing smoothing filter (RSF) to a current block in the current image are derived. If the control flags indicate to apply RSF to the current block, the RSF is applied to the current block.

BRIEF DESCRIPTION OF THE DRAWINGS

FIGS. 3 A-C illustrates examples of the block diagram of HEVC with RSF applied to the reconstructed frame at different positions.

FIGS. 5 A-C illustrate examples of the block diagram based on HEVC with RSF applied to the reconstructed frame at different locations.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As mentioned before, the coding process often causes artefacts in the reconstructed video. For example, the block based coding structure often causes blocking effect around block boundaries. Therefore deblocking filter has been used to alleviate the blocking effect. Also, coding process may also cause intensity offset in the reconstructed video. Accordingly, SAO (sample adaptive offset) has been used to compensate the intensity offset. In reconstructed video, there is also another type of artefact, named "ringing artefact", which is caused by sharp transitions in images such as strong edges and lines. These strong edges and lines are transformed to many coefficients in frequency domain representations. The quantization process introduces distortion of these coefficients. When the quantized coefficients are inverse-transformed to reconstruct the edges or lines, wave-like artefacts or ripple structures, known as the ringing artefacts are visible in nearby regions.

In the present invention, a ringing smoothing filter (RSF) is disclosed to further remove or reduce the ringing artefacts so as to provide better quality and/or improve coding performance. RSF is placed in a location of the reconstruction path after inverse transform (IT) to compensate residual or decoded frames in both the encoder and the decoder.

According to the present invention, RSF can be any kind of edge-preserving filters, which is applied to the residuals or the reconstructed frame to suppress ringing artefacts resulted from quantization errors. Bilateral filter by Paris, et al. ("Bilateral Filtering: Theory and Applications, Foundations and Trends in Computer Graphics and Vision, Vol. 4, No. 1 (2008), pp 1-73) aims to reduce noise and artefacts while preserving edges and important details in an image. Bilateral filter is a good edge-preserving filter for RSF. To reduce side information of RSF transmitting from the encoder to the decoder, parameters of bilateral filter or any other edge-preserving filters employed in RSF can be estimated based on coding information and characteristic properties of the reconstructed frame.

Figure 1A:
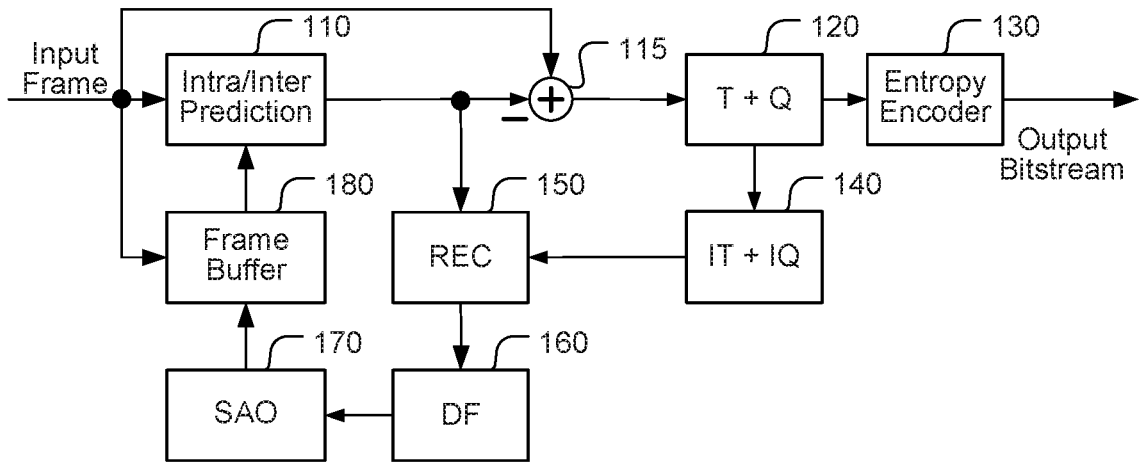
FIG. 1A illustrates an exemplary adaptive Inter/Intra video coding system incorporating in-loop filter processing based on HEVC.
Figure 2:
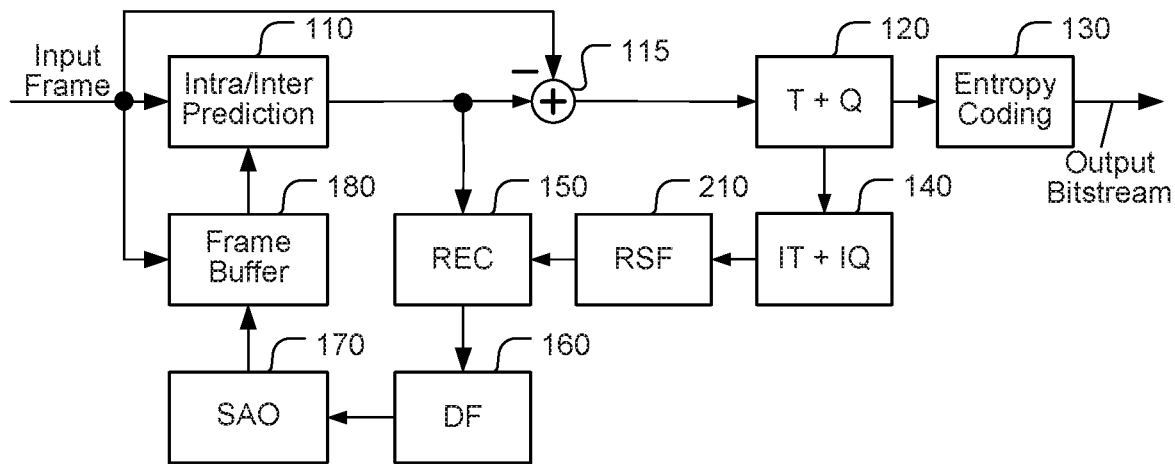
FIG. 2 illustrates an exemplary block diagram of an encoder based on the HEVC encoder in FIG. 1A with the RSF applied to residual.

FIG. 2 illustrates an exemplary block diagram of an encoder based on the HEVC encoder in FIG. 1A with the RSF applied to the residuals after inverse transform. In this case, RSF 210 is performed for each TU block. In this example, the input of RSF 210 corresponds to reconstructed residuals after inverse transform and its outputs are the smoothed reconstructed residuals.

Figure 3A:
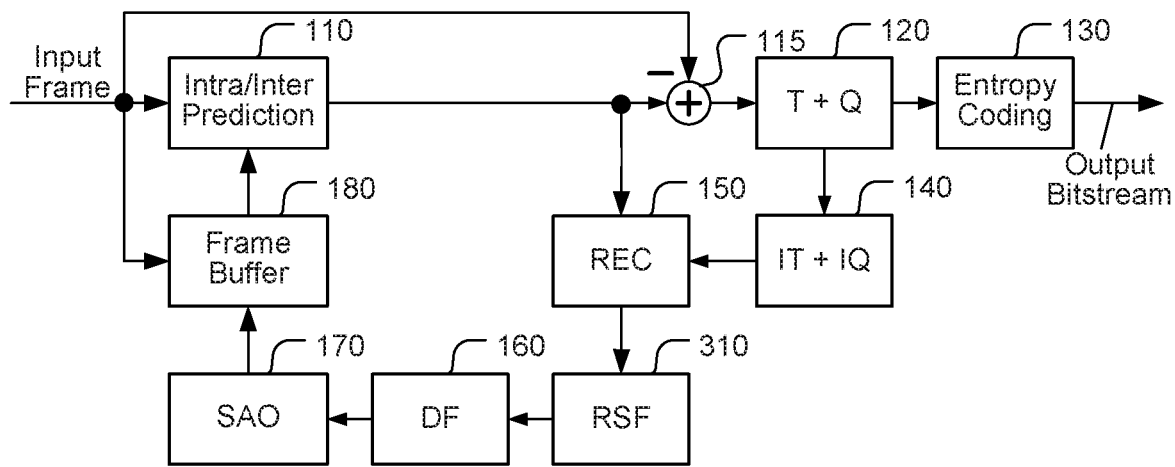
In FIG. 3A, RSF is placed after reconstruction (i.e., reconstructed residual plus the prediction) and before DF.
Figure 3B:
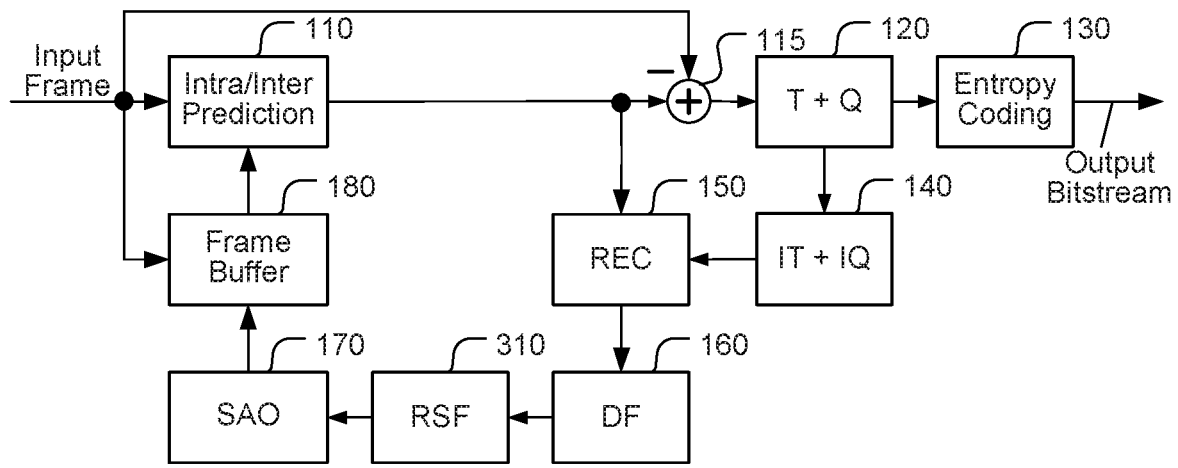
In FIG. 3B, RSF 310 is placed between DF and SAO.
Figure 3C:
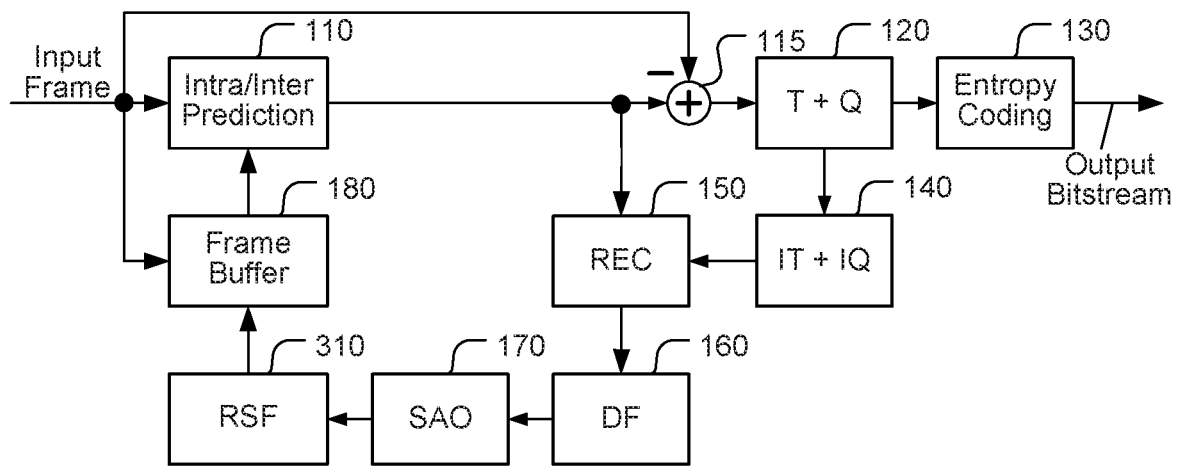
In FIG. 3C, RSF 310 is placed after SAO. The present invention may also be applied to other encoder such as an encoder incorporating other in-loop-filter (e.g. adaptive loop filter, ALF) after SAO. In this case, the RSF 310 can be applied to other in-loop filter or immediately before outputting to the frame buffer.

According to the present invention, the RSF may also be incorporated in other locations of the encoding/reconstruction chain. FIGS. 3 A-C illustrate examples of the block diagram based on HEVC with RSF applied to the reconstructed frame at different locations. In FIG. 3A, RSF 310 is placed between REC 150 (i.e., reconstructed residual plus the prediction) and DF 160, so the input of RSF 310 corresponds to reconstruction data (i.e., reconstructed residual plus the prediction) and the output of RSF 310 corresponds to the smoothed reconstructed data. In FIG. 3B, RSF 310 is placed between DF 160 and SAO 170. In FIG. 3C, RSF 310 is placed after SAO 170. The present invention may also be applied to other encoders such as an encoder incorporating other in-loop-filter (e.g. adaptive loop filter, ALF) after SAO 170. In this case, the RSF 310 can be applied to other in-loop filter or immediately before outputting to the frame buffer 180.

Figure 1B:
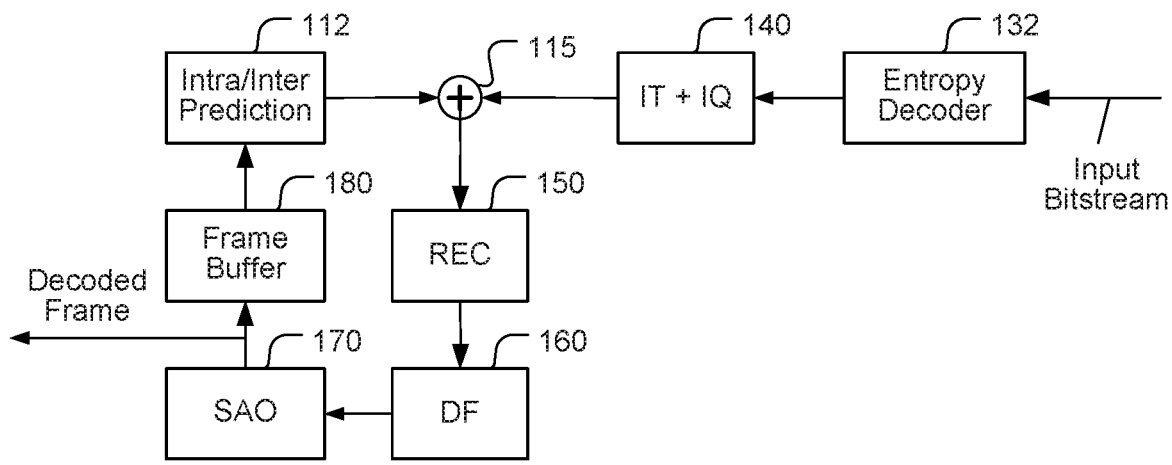
FIG. 1B illustrates a system block diagram of a corresponding video decoder for the encoder system in FIG. 1A.
Figure 4:
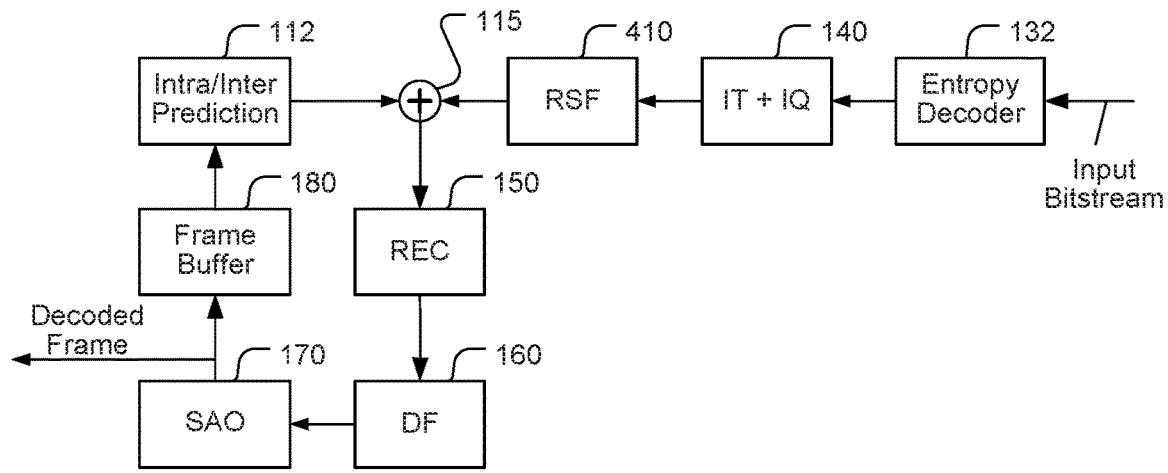
FIG. 4 illustrates an exemplary block diagram of a decoder based on the HEVC decoder in FIG. 1B with the RSF applied to residual.

FIG. 4 illustrates an exemplary block diagram of a decoder based on the HEVC decoder in FIG. 1B with the RSF applied to residual. In this case, RSF 410 is performed for each TU residual block. In this example, the input of RSF 410 corresponds to the reconstructed residuals and its outputs are the smoothed reconstructed residuals.

Figure 5A:
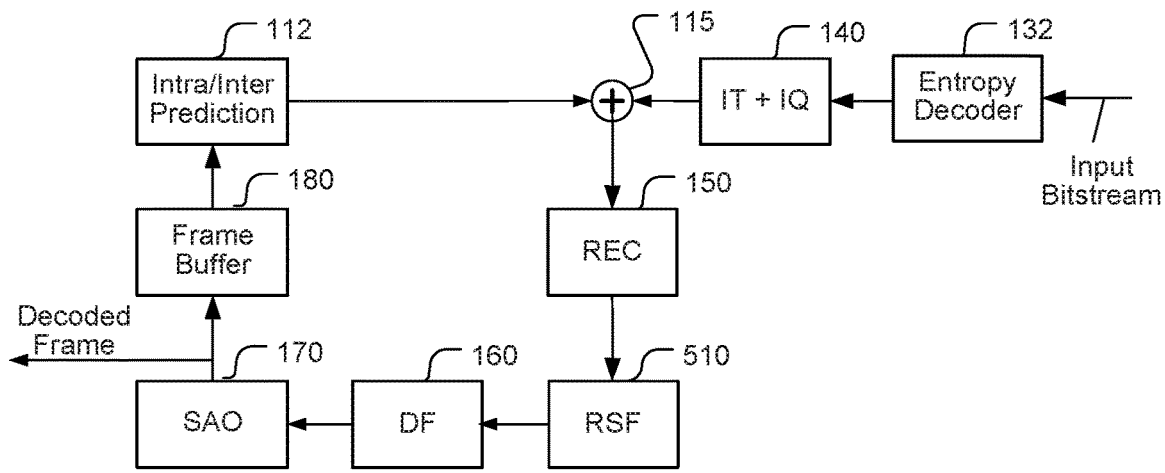
In FIG. 5A, RSF is placed between the reconstruction unit (i.e., reconstructed residual plus the prediction) and DF.
Figure 5B:
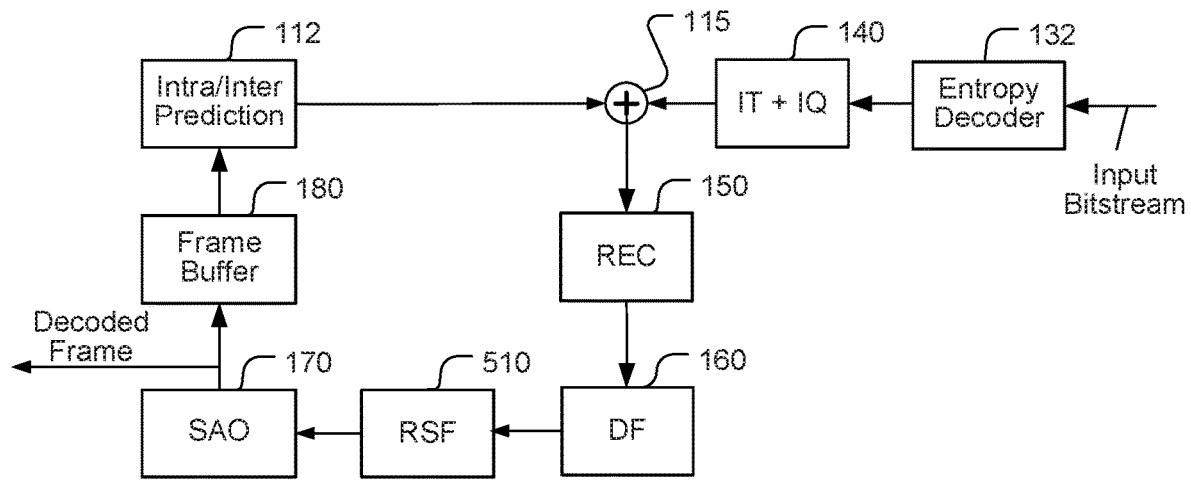
In FIG. 5B, RSF is placed between DF and SAO.
Figure 5C:
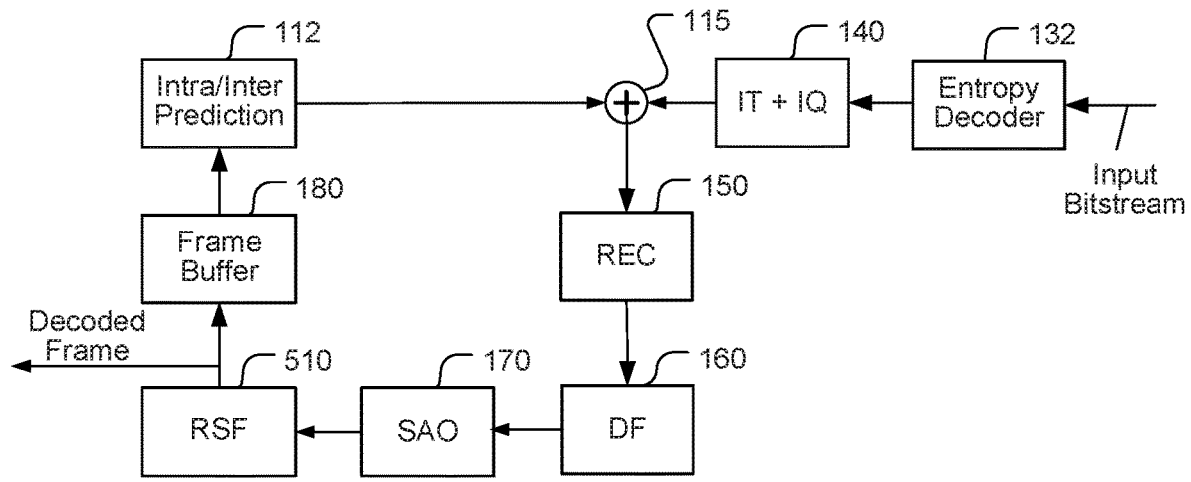
In FIG. 5C, RSF is placed after SAO.

According to the present invention, the RSF may also be incorporated in other locations of the decoding chain. FIGS. 5 A-C illustrate examples of the block diagram based on HEVC with RSF applied to the reconstructed frame at different locations. In FIG. 5A, RSF 510 is placed between the REC 150 and DF 160 (i.e., the input of RSF 510 corresponds reconstructed residual plus the prediction). In FIG. 5B, RSF 510 is placed between DF 160 and SAO 170. In FIG. 5C, RSF 510 is placed after SAO 170. The present invention may also be applied to other decoders such as a decoder incorporating other in-loop-filter (e.g. adaptive loop filter, ALF) after SAO 170. In this case, the RSF 510 can be applied to other in-loop filter or immediately before outputting to the frame buffer 180.

RSF can be any kind of edge-preserving filter. Bilateral filter is a well-known edge-preserving filter, which is a good candidate filter for the RSF. Bilateral filter is composed of the spatial filter and the range filter. The spatial filter, which is a Gaussian weighting filter, determines the influence of nearby pixels according to the distance between the centre pixel and the nearby pixels within a window cantered by the current pixel being filtered. The nearby pixels closer to the centre pixel have higher weighting in the spatial filter. The range filter, which is also a Gaussian weighting filter, is utilized to preserve edges by decreasing the influence of nearby pixels if their intensities differ from the centre pixel. The nearby pixel with similar intensity as the centre pixel has higher weighting in the range filter. Eqn. (1) shows the formula of the bilateral filter by Paris, et al. In the formula, the bilateral filter, denoted by BF[·]. The centre pixel p will be filtered with its nearby pixel q. $G_{\sigma_s}(\|p-q\|) G_{\sigma_r}(\|I_p-I_q\|)$ is the weight assigned to q to filter the centre pixel p. $G_{\sigma_s}(\|I_p-I_q\|)$ is the spatial filter, which is a Gaussian weighting function, where $\sigma_s$ is the spatial parameter. Similarly, $G_{\sigma_r}(\|I_p-I_q\|)$ is the range filter, which is also a Gaussian weighting function with a range parameter $\sigma_r$. In Eqn. (2) of the bilateral filter by Paris, et al., $w_p$ is the normalization factor, which is used to ensure pixel weights sum to 1.0.

$$BF[I]_p = \frac{1}{W_p} \sum_{q \in S} G_{\sigma_s}(\|p-q\|) G_{\sigma_r}(\|I_p - I_q\|) I_q. \quad (1)$$

$$W_p = \sum_{q \in S} G_{\sigma_s}(\|p-q\|) G_{\sigma_r}(\|I_p - I_q\|). \quad (2)$$

In one embodiment, if the coding type is the vertical or horizontal mode in Intra prediction, RSF can be a one-dimensional edge-preserving filter, which aims to compensate artefacts along the direction orthogonal to the prediction direction or along the prediction direction. For example, if the Intra prediction mode is vertical mode, 1-D RSF in the horizontal direction or the vertical direction can be an option to reduce the processing time while retaining the coding efficiency.

In another embodiment, coefficients (e.g. Gaussian weights of the spatial and the range filter in bilateral filter) and footprints of RSF can vary according to the characteristics of textures in the reconstructed frame. The characteristics of textures in the reconstructed frame can be estimated from the prediction modes (e.g. the angular direction in Intra prediction). For example, for an angular direction in Intra prediction, values of coefficients along the direction same as or orthogonal to the angular prediction direction can be adjusted higher compared to the remaining coefficients of the filter. In addition, the shape of the footprint and parameters (e.g. $\sigma_s$ and $\sigma_r$ in bilateral filter) of RSF can also be adjusted to fit the angular prediction direction for the Intra prediction cases. Also, the footprint can be adapted to texture patterns of the reconstructed frame for both Intra and Inter prediction cases. For example, if the current block is predicted using the vertical mode in Intra prediction, the footprint can be shrunken to a vertical filter (or horizontal filter). For the diagonal related modes, the footprint can be shrunken to along the diagonal direction (or orthogonal to the diagonal direction). The coefficients and footprints of RSF can also vary according the transform type. For example, $\sigma_s$ and $\sigma_r$ and filter footprint can be adjusted according to different row/column transform and secondary transform.

In another embodiment, the configuration setting of RSF for luma and chroma can be determined separately due to different characteristics between the luma and chroma signals. For example, the chroma signal usually contains more middle or low frequency signals compared to the luma signal. The configuration setting of RSF may comprise the number of taps or parameters (e.g. $\sigma_s$ and $\sigma_r$ in bilateral filter) used in the filter. Accordingly, different parameter settings to control the smoothing strength of the filter in RSF can help the luma signal and the chroma signal to remove artefacts within appropriate frequency band. For example, the spatial parameter, $\sigma_s$ in bilateral filter for the luma signal can be more sensitive compared to that of the chroma signal since the luma signal usually contains much more high frequency details than the chroma signal within the same area in an image.

If the bilateral filter is employed as the RSF, the bilateral filter can be expressed in a more generalized form as shown in eqn. (3) and eqn. (4). The weighting $W_q$, $\sigma_s$ and $\sigma_r$ depend on the position of the pixel q in the footprint and the content formation (e.g. the TU size, position in a TU, bit-depth, colour format, colour component, QP, CU/PU/TU-level mode (e.g. Intra/Intra mode, Intra prediction mode), transform type, or any combination of above items).

$$BF[I]_p = \frac{1}{W_p} \sum_{q \in S} W_q G_{\sigma_s}(\|p - q\|) G_{\sigma_r}(\|I_p - I_q\|) I_q \quad (3)$$

$$W_p = \sum_{q \in S} W_q G_{\sigma_s}(\|p - q\|) G_{\sigma_r}(\|I_p - I_q\|). \quad (4)$$

Wq can depend on the transform type. If the vertical transform is skipped or the identical transform is applied to the vertical direction, Wq can be set to 0 for pixel q, which is not at the same y-position as pixel p (i.e., the current centre pixel).

In another embodiment, in order to achieve better coding performance, on/off control flags can be adaptively incorporated at different levels, i.e., sequence-level, picture-level, slice-level, CTU-level, CU-level, PU-level, and/or TU-level, or any combination of above items. The on/off control can be determined by the coding information or the characteristic properties of residuals or the reconstructed frame.

In another embodiment, to smooth the filtered result for better subjective quality and higher coding performance, the smoothed reconstructed residuals/reconstructed frame can be further blended with the original reconstructed residual/reconstructed frame. The weight to blend the un-smoothed and the smoothed reconstructed residual/reconstructed frames can be adjusted based on the difference of value between the un-smoothed and the smoothed reconstructed residual/reconstructed frames.

In another embodiment, the difference of value between the un-smoothed and smoothed reconstructed residual data or the reconstructed frame can be clipped to a range. The clipping range can be a fixed range or an adaptive range. The range can depend on the TU size, magnitude of residual data, position in a TU, bit-depth, colour format, colour component, QP, CU/PU/TU-level mode (e.g. intra/intra mode), transform type, or any combination of above items.

Figure 6:
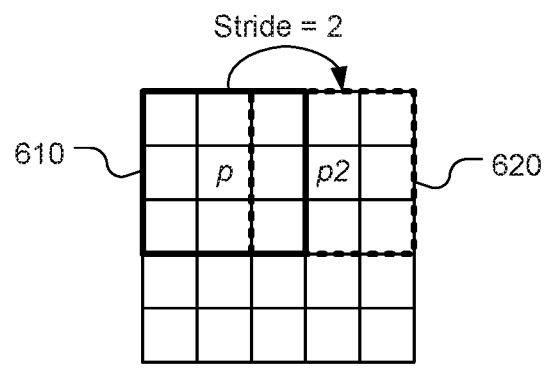
FIG. 6 illustrates an example of a filter in RSF with kernel size 3×3 and "stride"=2.

In another embodiment, the filter size of RSF can be adjusted adaptively according to resolution-related information, such as the resolution of the reconstructed frame or the coding information such as QP, position in a TU, sizes of CTU, CU, PU and/or TU, or prediction mode in Intra or Inter cases, or any combination of above items. Also, there are many other configuration settings that can refer to the resolution-related information. For example, one configuration setting can be designated as the variable "stride", which determines the pixel distance between the current pixel and the next pixel to be filtered. FIG. 6 illustrates an example of a filter in RSF with kernel size 3×3 and stride=2. In FIG. 6, after the pixel p is filtered using its neighbouring pixels within the 3×3 window 610 (as shown in thick-line square) the next pixel p2 is then filtered using the 3×3 window 620 (as shown in thick-dash-line square).

Figure 7:
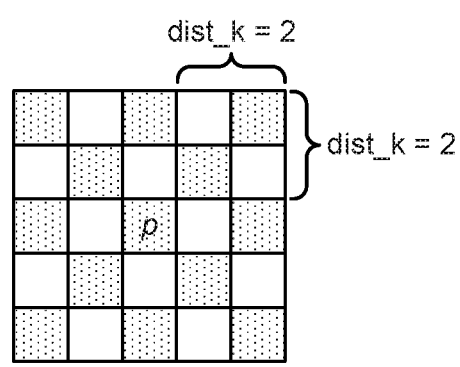
FIG. 7 illustrates an example of RSF with kernel size equal to 3×3 and sub-sampling distance equal to 2.

In another embodiment, the RSF is applied to sub-sampled pixels. The sampling distance between two neighbouring pixels to be referenced can also be configurable based on resolution-related information (e.g. the resolution of the reconstructed frame), the coding information (e.g. QP, position in a TU, sizes of CTU, CU, PU and/or TU, or prediction mode in Intra or Inter cases) or any combination of the above items. FIG. 7 illustrates an example of RSF with kernel size equal to 3×3 and sampling distance (i.e., dist_k) equal to 2, where the sub-sampled pixels used for RSF are indicated by indicated by squares with filled pattern.

FIG. 7 illustrates an example of RSF with kernel size equal to 3×3 and dist_k equal to 2. If the location of the centre pixel p is (i, j), then p will be filtered using neighbouring pixels at location (i−2, j−2), (i−2, j), (i−2, j+2), (i, j−2), (i, j), (i, j+2), (i+2, j−2), (i+2, j), and (i+2, j+2).

In order to reduce the number of calculations, the bilateral filter can be implemented using a look-up-table (LUT) storing all weights for a particular QP in a two-dimensional array. Similar idea can be extended to the present invention with a more generalized form of RSF. Accordingly, in another embodiment, coefficients or parameters associated with the RSF can be stored in a Look-Up Table (LUT) to reduce required calculations. In addition, in order to reduce side information of RSF transmitted from the encoder to the decoder, parameters of RSF can be estimated based on coding information, characteristic properties of residual data or the reconstructed frame. Furthermore, in another embodiment, the encoder and decoder may take advantage of the temporal correlation between adjacent video frames and reuse the parameters of RSF obtained from previous encoded frames.

If the filter footprint covers the unavailable pixels, the footprint can be reshaped according to one embodiment. In another embodiment, the padding/mirroring can be used to generate the unavailable pixels for the filter.

Figure 8:
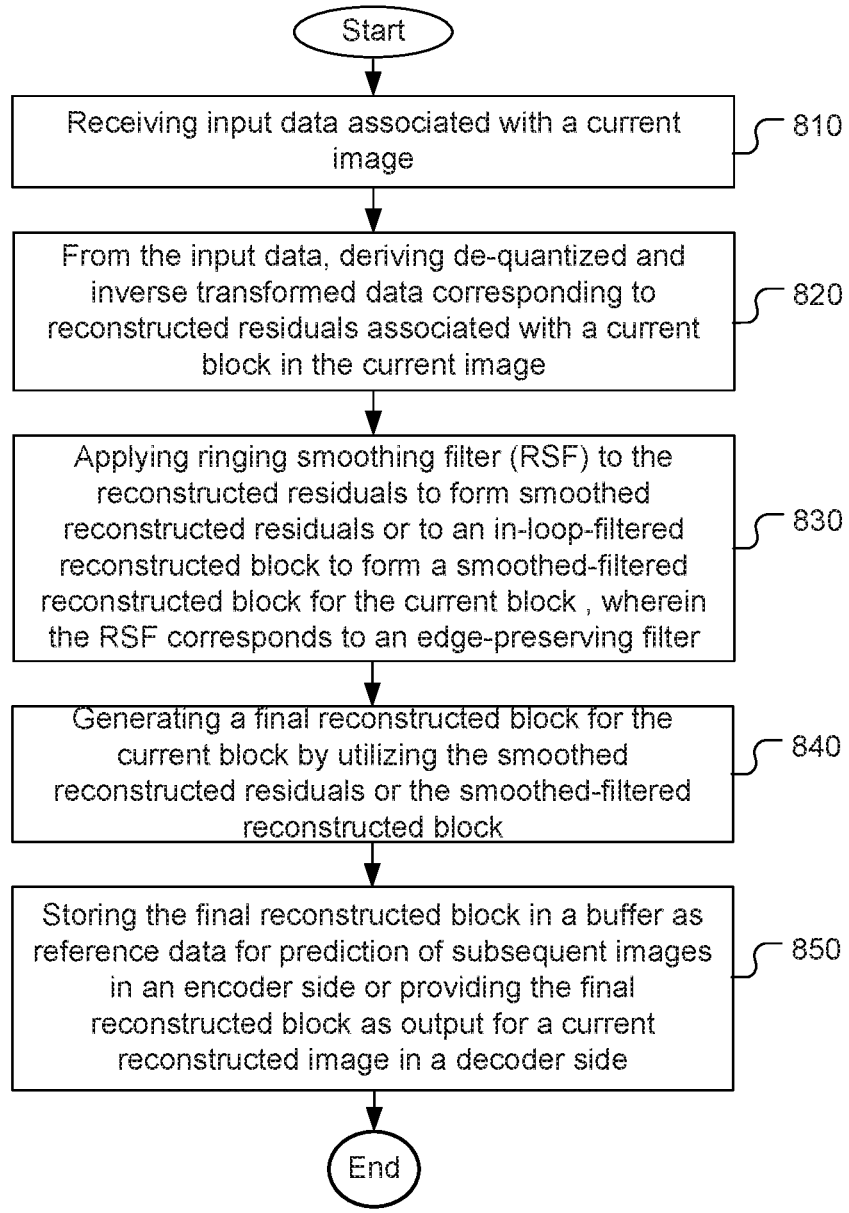
FIG. 8 illustrates a flowchart of an exemplary coding system using ringing smoothing filter (RSF) according to one embodiment of the present invention.

FIG. 8 illustrates a flowchart of an exemplary coding system using ringing smoothing filter (RSF). The steps shown in the flowchart may be implemented as program codes executable on one or more processors (e.g., one or more CPUs) at the encoder side or the decoder side. The steps shown in the flowchart may also be implemented based hardware such as one or more electronic devices or processors arranged to perform the steps in the flowchart. According to this method, input data associated with a current image are received in step 810. From the input data, de-quantized and inverse transformed data corresponding to reconstructed residuals associated with a current block in the current image are derived in step 820. At the decoder side, the input data correspond to a bitstream including compressed data of the current image. The de-quantized and inverse transformed data are derived from the input data by applying entropy decoding to derive transformed-quantized residuals from the bitstream and applying inverse transform and de-quantization to the transformed-quantized residuals to form the reconstructed residuals. At the encoder side, the input data correspond to pixel data of the current image. The de-quantized and inverse transformed data are derived from the input data by applying Inter or Intra prediction to a current block in the current image to generate residuals associated with the current block, applying transform and quantization to the residuals to derive transformed-quantized residuals, and applying inverse transform and de-quantization to the transformed-quantized residuals to form the reconstructed residuals. Ringing smoothing filter (RSF) is applied to the reconstructed residuals to form smoothed reconstructed residuals or to an in-loop-filtered reconstructed block to form a smoothed-filtered reconstructed block for the current block in step 830, where the RSF corresponds to an edge-preserving filter. A final reconstructed block is generated for the current block by utilizing the smoothed reconstructed residuals or the smoothed-filtered reconstructed block in step 840. In step 850, the final reconstructed block is stored in a buffer as reference data for prediction of subsequent images in an encoder side or the final reconstructed block is provided as output for a current reconstructed image in a decoder side.

Figure 9:
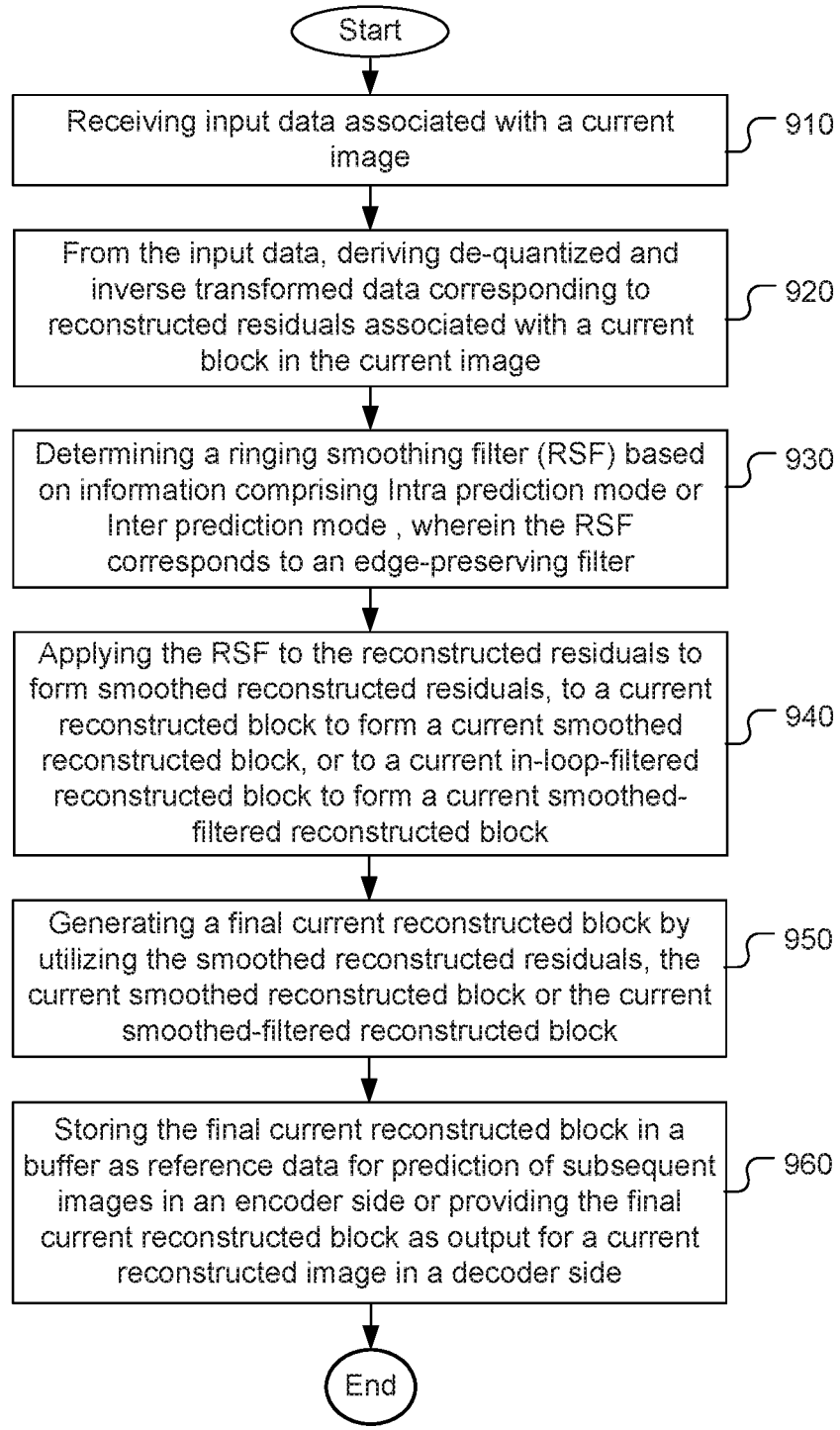
FIG. 9 illustrates a flowchart of an exemplary coding system using ringing smoothing filter (RSF) according to one embodiment of the present invention, where the RSF is adaptively derived.

FIG. 9 illustrates a flowchart of another exemplary coding system using ringing smoothing filter (RSF). According to this method, input data associated with a current image are received in step 910. From the input data, de-quantized and inverse transformed data corresponding to reconstructed residuals associated with a current block in the current image are derived in step 920. A ringing smoothing filter (RSF) is determined based on information comprising Intra prediction mode or Inter prediction mode in step 930, where the RSF corresponds to an edge-preserving filter. The RSF is applied to the reconstructed residuals to form smoothed reconstructed residuals, to a current reconstructed block to form a current smoothed reconstructed block, or to a current in-loop-filtered reconstructed block to form a current smoothed-filtered reconstructed block in step 940. A final current reconstructed block is generated by utilizing the smoothed reconstructed residuals, the current smoothed reconstructed block or the current smoothed-filtered reconstructed block in step 950. In step 960, the final reconstructed block is stored in a buffer as reference data for prediction of subsequent images in an encoder side or the final reconstructed block is provided as output for a current reconstructed image in a decoder side.

Figure 10:
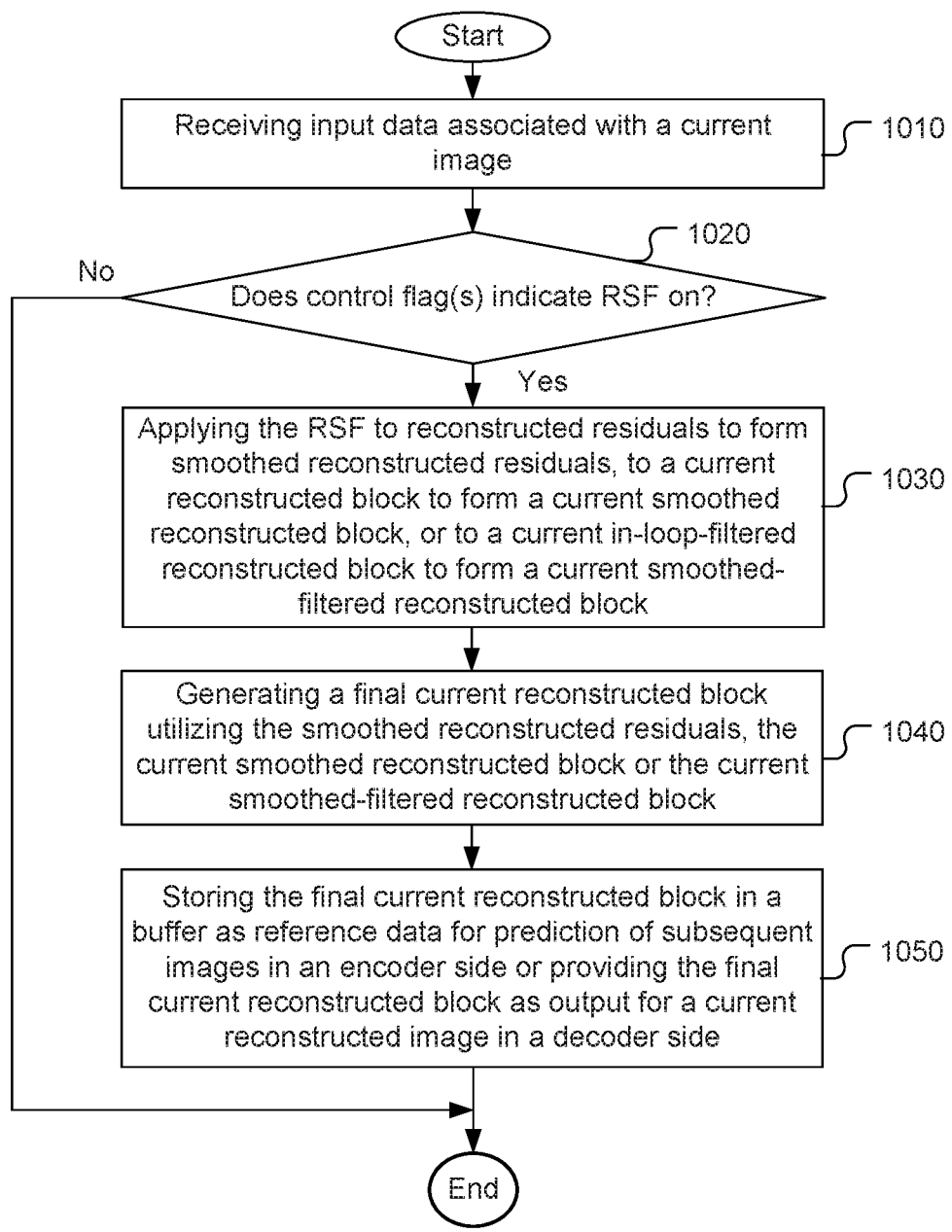
FIG. 10 illustrates a flowchart of an exemplary coding system using ringing smoothing filter (RSF) according to one embodiment of the present invention, where the RSF is applied according to control flag(s).

FIG. 10 illustrates a flowchart of yet another exemplary coding system using ringing smoothing filter (RSF). According to this method, input data associated with a current image are received in step 1010. Whether the control flag(s) indicates the RSF to be on is checked in step 1020. If the RSF is on (i.e., the "yes" path from step 1020), steps 1030 through 1050 are performed. Otherwise (i.e., the "No" path from step 1020), steps 1030 through 1050 are skipped. In step 1030, the RSF is applied to reconstructed residuals to form smoothed reconstructed residuals, to a current reconstructed block to form a current smoothed reconstructed block, or to a current in-loop-filtered reconstructed block to form a current smoothed-filtered reconstructed block. In step 1040, a final current reconstructed block is generated by utilizing the smoothed reconstructed residuals, the current smoothed reconstructed block or the current smoothed-filtered reconstructed block. In step 1050, the final reconstructed block is stored in a buffer as reference data for prediction of subsequent images in an encoder side or the final reconstructed block is provided as output for a current reconstructed image in a decoder side.

The flowcharts shown are intended to illustrate examples of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

In still another embodiment, the above presented methods can also be applied to other flexible block partition variants, as long as a target block can be generated by two or more different partitions.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding or decoding used by a video encoder or decoder respectively, the method comprising:

receiving input data associated with a current image;

from the input data, deriving de-quantized and inverse transformed data corresponding to reconstructed residuals associated with a current block in the current image;

determining a ringing smoothing filter (RSF) based on information comprising Intra prediction mode or Inter prediction mode, wherein the RSF corresponds to an edge-preserving filter;

applying the RSF to the reconstructed residuals to form smoothed reconstructed residuals, to a current reconstructed block to form a current smoothed reconstructed block, or to a current in-loop-filtered reconstructed block to form a current smoothed-filtered reconstructed block;

generating a final current reconstructed block by utilizing the smoothed reconstructed residuals, the current smoothed reconstructed block or the current smoothed-filtered reconstructed block; and storing the final current reconstructed block in a buffer as reference data for prediction of subsequent images in an encoder side or providing the final current reconstructed block as output for a current reconstructed image in a decoder side, wherein said applying the RSF comprises combining RSF filtered samples with un-filtered samples, and wherein one or more weights for said RSF filtered samples with un-filtered samples are adjusted based on differences between the RSF filtered samples and the un-filtered samples.

2. The method of claim 1, wherein the differences between the RSF filtered samples and the un-filtered samples are clipped to a range.

* * * * *